US011090737B2

(12) United States Patent
Filho et al.

(10) Patent No.: US 11,090,737 B2
(45) Date of Patent: Aug. 17, 2021

(54) ROTARY CUTTING TOOL WITH TUNABLE VIBRATION ABSORBER ASSEMBLY FOR SUPPRESSING TORSIONAL VIBRATION

(71) Applicant: Kennametal Inc., Latrobe, PA (US)

(72) Inventors: Ruy Frota de Souza Filho, Latrobe, PA (US); Logan M. Semnisky, Latrobe, PA (US)

(73) Assignee: KENNAMETAL INC., Latrobe, PA (US)

( * ) Notice: Subject to any disclaimer, the term of this patent is extended or adjusted under 35 U.S.C. 154(b) by 71 days.

(21) Appl. No.: 16/555,412

(22) Filed: Aug. 29, 2019

(65) Prior Publication Data

US 2021/0060661 A1 Mar. 4, 2021

(51) Int. Cl.
*B23B 51/02* (2006.01)
*B33Y 80/00* (2015.01)

(52) U.S. Cl.
CPC .......... *B23B 51/02* (2013.01); *B23B 2250/16* (2013.01); *B23B 2251/02* (2013.01); *B23B 2251/40* (2013.01); *B23B 2251/50* (2013.01); *B23B 2251/70* (2013.01); *B33Y 80/00* (2014.12)

(58) Field of Classification Search
CPC .. B23B 51/02; B23B 2250/16; B23B 2251/70
See application file for complete search history.

(56) References Cited

U.S. PATENT DOCUMENTS

| 3,207,009 | A | * | 9/1965 | Carlstedt | ............ | B23Q 17/0976 |
| | | | | | | 408/143 |
| 3,207,014 | A | | 9/1965 | Carlstedt | | |
| 3,559,512 | A | * | 2/1971 | Aggarwal | ................. | F16F 7/10 |
| | | | | | | 408/143 |
| 3,690,414 | A | * | 9/1972 | Aggarwal | .......... | B23Q 11/0032 |
| | | | | | | 188/378 |
| 3,923,414 | A | * | 12/1975 | Hopkins | ............... | B23B 29/022 |
| | | | | | | 408/143 |

(Continued)

FOREIGN PATENT DOCUMENTS

| CA | 2136786 A | 5/1996 |
| CH | 446 820 A | 11/1967 |

(Continued)

*Primary Examiner* — Eric A. Gates
(74) *Attorney, Agent, or Firm* — Larry R. Meenan (57) ABSTRACT

A rotary cutting tool includes a tool body including a chip flute portion having a plurality of helical chip flutes separated by lobes. In one aspect, a tunable vibration absorber assembly is disposed within a cavity formed in the chip flute portion. In another aspect, the tunable vibration absorber assembly is disposed within a cavity of a replaceable cutting head. In each aspect, the tunable vibration absorber assembly includes one or more tunable absorber masses, a resilient material between the one or more absorber masses and the cavity, and one or more connecting members for preventing relative angular displacement of the one or more tunable absorber masses. The one or more tunable absorber masses are suspended only by the resilient material, thereby enabling the tunable vibration absorber assembly to be tuned to a desired frequency for suppressing torsional vibration of the rotary cutting tool during a cutting operation.

7 Claims, 9 Drawing Sheets

(56) References Cited

U.S. PATENT DOCUMENTS

| | | | |
|---|---|---|---|
| 3,938,626 A * | 2/1976 | Hopkins | B23B 29/022 |
| | | | 188/378 |
| 4,903,785 A * | 2/1990 | Odoni | B23B 51/00 |
| | | | 173/131 |
| 6,443,674 B1 | 9/2002 | Jaconi | |
| 6,601,659 B2 * | 8/2003 | Saitta | B23B 51/02 |
| | | | 175/323 |
| 6,916,138 B2 * | 7/2005 | Bergholt | B23B 51/048 |
| | | | 408/143 |
| 6,929,431 B2 | 8/2005 | Bergholt et al. | |
| 7,234,379 B2 * | 6/2007 | Claesson | B23B 27/002 |
| | | | 188/380 |
| 7,591,209 B2 * | 9/2009 | Murakami | B23B 27/002 |
| | | | 408/143 |
| 8,105,001 B2 | 1/2012 | Krenzer et al. | |
| 8,337,125 B2 * | 12/2012 | Digernes | B23C 5/28 |
| | | | 408/143 |
| 8,376,669 B2 | 2/2013 | Jaeger et al. | |
| 8,784,016 B2 * | 7/2014 | Gamble | B23C 5/003 |
| | | | 408/143 |
| 9,073,159 B2 | 7/2015 | Jager et al. | |
| 9,079,255 B2 | 7/2015 | Jager et al. | |
| 9,889,506 B2 * | 2/2018 | Nakatani | F16F 15/08 |
| 10,500,648 B1 * | 12/2019 | Saffouri | B23B 29/125 |
| 2004/0028490 A1 | 2/2004 | Bergholt et al. | |
| 2008/0199268 A1 | 8/2008 | Krenzer et al. | |
| 2011/0097168 A1 | 4/2011 | Jager et al. | |
| 2012/0301240 A1 | 11/2012 | Jager et al. | |
| 2015/0258612 A1 | 9/2015 | Frota De Souza Filho | |
| 2015/0328696 A1 | 11/2015 | Wang et al. | |

FOREIGN PATENT DOCUMENTS

| | | | | |
|---|---|---|---|---|
| DE | 10 2017 212 053 A1 | | 1/2019 | |
| GB | 1100492 | | 1/1968 | |
| JP | 61076251 A | * | 4/1986 | B23Q 17/0976 |
| JP | 06031507 A | * | 2/1994 | |
| JP | 2000308941 A | * | 11/2000 | |
| JP | 2006102837 A | * | 4/2006 | |
| RU | 2011478 C1 | * | 4/1994 | |
| WO | 2010/105608 A1 | | 9/2010 | |

* cited by examiner

ROTARY CUTTING TOOL WITH TUNABLE VIBRATION ABSORBER ASSEMBLY FOR SUPPRESSING TORSIONAL VIBRATION

FIELD OF THE INVENTION

In general, the invention relates to a rotating cutting tool, and more particularly, to a rotary cutting tool, such as a twist drill, modular drill, and the like, with a tunable vibration absorber assembly for suppressing torsional vibration.

BACKGROUND OF THE INVENTION

During a metal cutting operation, any vibratory motion between a cutting tool and workpiece may lead to undesirable cutting performances, such as poor workpiece surface finish and out-of-tolerance finished workpieces. Furthermore, such vibration may cause the cutting tool or the machine tool to become damaged.

Torsional vibration in drills with helical flutes can generate oscillations in the axial direction due to the helical shape of the flutes, which in turn can cause chip thickness variation, thereby leading to chatter. Typically, the self-excited vibrations caused by torsional (axial) vibration takes place at high frequencies and generates undesirable noise. This problem is particularly critical in large diameter modular drills and in rotating cutting tools with large length/diameter (i.e., L/D) ratios.

Thus, there is a need to suppress or eliminate torsional vibrations in a rotating cutting tool.

SUMMARY OF THE INVENTION

The problem of suppressing the torsional mode in a rotary cutting tool is solved by providing a tunable vibration absorber assembly having one or more at least two tunable absorber masses that follow the shape of the lobes of the flutes in the rotary cutting tool. The tunable absorber masses are suspended by elastomer or other resilient support members. The material properties of the support members, such as stiffness, viscous damping, and the like, are selected in such a way that the torsional frequency of the tunable masses is set close to the torsional frequency of the drill body. For better performance, the tunable masses are firmly connected to each other. In one embodiment, the number of tunable masses is equal to the number of flutes.

In one aspect, a rotary cutting tool comprises a tool body including a chip flute portion having a plurality of helical chip flutes separated by lobes; and a tunable vibration absorber assembly disposed within a cavity formed in the chip flute portion. The tunable vibration absorber assembly comprises at least two tunable absorber masses, a resilient material between the at least two tunable absorber masses and the cavity, and one or more connecting members for preventing relative angular displacement between the at least two tunable absorber masses about the central, longitudinal axis of the cutting tool. The one or more connecting members do not contact the tool body to enable the at least two tunable absorber masses to be suspended only by the resilient material, thereby enabling the tunable vibration absorber assembly to be tuned to a desired frequency for suppressing torsional vibration of the rotary cutting tool during a cutting operation.

In another aspect of the invention, a rotary cutting tool comprises a replaceable cutting head; a tool body including a pocket portion for holding the replaceable cutting head and a chip flute portion having a plurality of helical chip flutes separated by lobes; and a tunable vibration absorber assembly disposed within a cavity formed in the replaceable cutting head. The tunable vibration absorber assembly comprises at least two tunable absorber masses, a resilient material between the one or more absorber masses and the cavity, and one or more connecting members for preventing relative angular displacement between the at least two tunable absorber masses about the central, longitudinal axis of the cutting tool. The one or more connecting members do not contact the replaceable cutting head to enable the at least two tunable absorber masses to be suspended only by the resilient material, thereby enabling the tunable vibration absorber assembly to be tuned to a desired frequency for suppressing torsional vibration of the rotary cutting tool during a cutting operation.

In another aspect, a method of suppressing torsional vibrations in a rotary cutting tool comprises disposing a tunable vibration absorber assembly within a cavity formed in the rotary cutting tool, the tunable vibration absorber assembly comprising one or more tunable absorber masses, a resilient material between the at least two tunable absorber masses and the cavity, and one or more connecting members for preventing relative angular displacement between the at least two tunable absorber masses about the central, longitudinal axis of the cutting tool; and tuning the tunable vibration absorber assembly to a desired frequency by selecting one or more material properties of the at least two tunable absorber masses, the resilient material and the one or more connecting members, thereby suppressing torsional vibration of the rotary cutting tool during a cutting operation.

BRIEF DESCRIPTION OF THE DRAWINGS

While various embodiments of the invention are illustrated, the particular embodiments shown should not be construed to limit the claims. It is anticipated that various changes and modifications may be made without departing from the scope of this invention.

DETAILED DESCRIPTION OF THE INVENTION

The description herein of specific applications should not be a limitation on the scope and extent of the use of the cutting tool.

Directional phrases used herein, such as, for example, left, right, front, back, top, bottom and derivatives thereof, relate to the orientation of the elements shown in the drawings and are not limiting upon the claims unless expressly recited therein. Identical parts are provided with the same reference number in all drawings.

Approximating language, as used herein throughout the specification and claims, may be applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

Throughout the text and the claims, use of the word "about" in relation to a range of values (e.g., "about 22 to 35 wt %") is intended to modify both the high and low values recited, and reflects the penumbra of variation associated with measurement, significant figures, and interchangeability, all as understood by a person having ordinary skill in the art to which this invention pertains.

For purposes of this specification (other than in the operating examples), unless otherwise indicated, all numbers expressing quantities and ranges of ingredients, process conditions, etc., are to be understood as modified in all instances by the term "about". Accordingly, unless indicated to the contrary, the numerical parameters set forth in this specification and attached claims are approximations that can vary depending upon the desired results sought to be obtained by the present invention. At the very least, and not as an attempt to limit the application of the doctrine of equivalents to the scope of the claims, each numerical parameter should at least be construed in light of the number of reported significant digits and by applying ordinary rounding techniques. Further, as used in this specification and the appended claims, the singular forms "a", "an" and "the" are intended to include plural referents, unless expressly and unequivocally limited to one referent.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements including that found in the measuring instrument. Also, it should be understood that any numerical range recited herein is intended to include all sub-ranges subsumed therein. For example, a range of "1 to 10" is intended to include all sub-ranges between and including the recited minimum value of 1 and the recited maximum value of 10, i.e., a range having a minimum value equal to or greater than 1 and a maximum value of equal to or less than 10. Because the disclosed numerical ranges are continuous, they include every value between the minimum and maximum values. Unless expressly indicated otherwise, the various numerical ranges specified in this application are approximations.

In the following specification and the claims, a number of terms are referenced that have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

As used herein, the term "helical" is defined as pertaining to or having the form of a helix or spiral. A "helix" or "spiral" is defined as a curve in three-dimensional space formed by a straight line drawn on a plane when that plane is wrapped around a cylindrical surface of any kind, especially a right circular cylinder, as the curve of a screw. A circular helix of radius a and slope b/a (or pitch 2πb) is described by the following parametrization:

$x(\theta) = a \sin \theta$,
$y(\theta) = a \cos \theta$,
$z(\theta) = b\theta$.

As used herein, the phrase "helix angle" is defined as the angle between any helix and an axial line on its right, circular cylinder or cone. The helix angle references the axis of the cylinder, distinguishing it from the lead angle, which references a line perpendicular to the axis. Thus, the helix angle is the geometric complement of the lead angle. The helix angle is measured in degrees.

As used herein, the helix of a flute can twist in two possible directions, which is known as handedness. Most flutes are oriented so that the cutting tool, when seen from a point of view on the axis through the center of the helix, moves away from the viewer when it is turned in a clockwise direction, and moves towards the viewer when it is turned counterclockwise. This is known as a right-handed (RH) flute geometry, because it follows the right-hand grip rule. Flutes oriented in the opposite direction are known as left-handed (LH).

As used herein, the term "3D printing" is any of various processes in which material is joined or solidified under computer control to create a three-dimensional object, with material being added together, such as liquid molecules or powder grains being fused together, typically layer by layer. In the 1990s, 3D printing techniques were considered suitable only to the production of functional or aesthetical prototypes and, back then, a more comprehensive term for 3D printing was rapid prototyping. Today, the precision, repeatability and material range have increased to the point that 3D printing is considered as an industrial production technology, with the official term of "additive manufacturing".

As used herein, the term "torsional vibration" is angular vibration of an object, such as a shaft of a rotating cutting tool, along its axis of rotation.

As used herein, the term "axial vibration" is vibration of an object, such as a shaft of a rotating cutting tool, along its axis of rotation.

Figure 1:
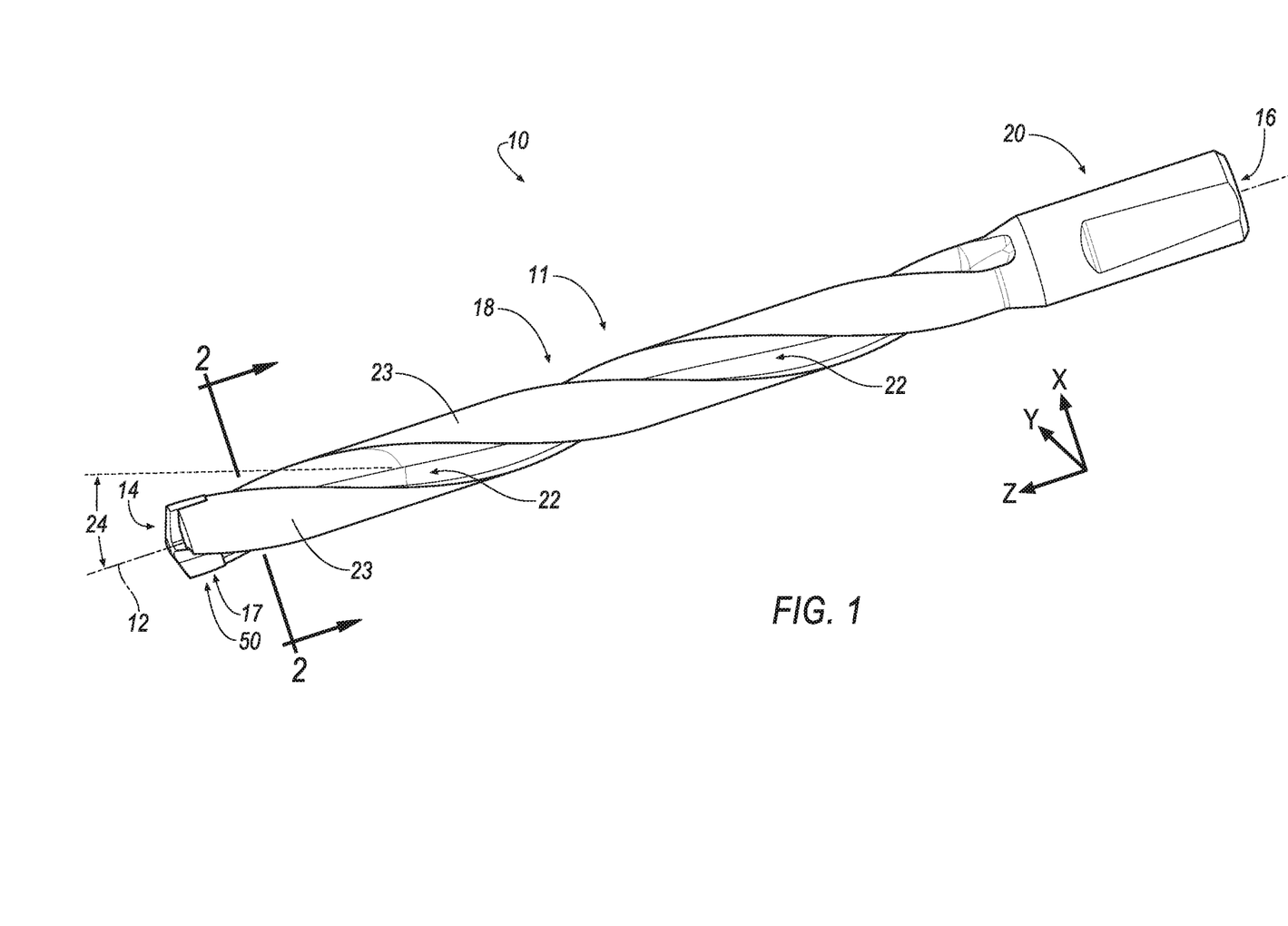
FIG. 1 is a perspective view of a rotary cutting tool, such as a modular drill, with an internal tunable vibration absorber assembly according to an embodiment of the invention.

Referring now to FIG. 1, a rotary cutting tool 10 for conducting cutting operations on a workpiece (not shown) when the rotary cutting tool 10 is rotated about a central, longitudinal axis 12 is shown according to an exemplary embodiment of the invention. Although depicted as a modular drill in the exemplary embodiment described herein, it is to be appreciated that the principles of the invention described herein are applicable to other rotary cutting tools, such as, for example, without limitation, a solid carbide drill, a milling tool, a reamer, a tap, an end mill, and the like.

The rotary cutting tool 10 is generally cylindrical and includes a first or forward end 14 and an opposite, second or rearward end 16. The rotary cutting tool 10 has a tool body 11 that includes a pocket portion 17 proximate the first end 14 for securely holding a replaceable cutting insert 50, and a chip flute portion 18 with at least two internal tunable absorber masses, as described in more detail below. The tool body 11 can be made of tool steel, carbide, or any other suitable material. The replaceable cutting insert 50 can be made, for example, of solid carbide, or any other suitable material. The tool body 11 also includes a mounting portion 20 proximate the second end 16 for mounting the rotary cutting tool 10 in a chuck mechanism of a machine tool (not shown).

The chip flute portion 18 further includes a plurality of helical chip flutes 22 separated by lobes 23 extending rearwardly from the first end 14 of the chip flute portion 18 to the mounting portion 20. Each chip flute 22 allows chips formed by the rotary cutting tool 10 to exit from the chip flute portion 18 during a cutting operation. Each chip flute 22 has a helical geometry or pattern and are disposed at a helix angle 24 relative to the central, longitudinal axis 12. In one embodiment, for example, the helix angle 24 is at or about 30 degrees (+/−2 degrees). However, it will be appreciated that the invention is not limited by the magnitude of the helix angle 24, and that the invention can be practiced with any desirable helix angle 24 in a range between about greater than 0° and about 75°.

In the illustrated embodiment, the rotary cutting tool 10 includes two flutes 22 (only one flute 22 is visible in FIG. 1) and two lobes 23. However, it should be appreciated that the invention is not limited by the number of flutes 22 and lobes 23, and that the invention can be practiced with a rotary cutting tool having any desirable number of flutes 22 and lobes 23, such as three, four, five, six, seven, eight, and the like.

Figure 2:
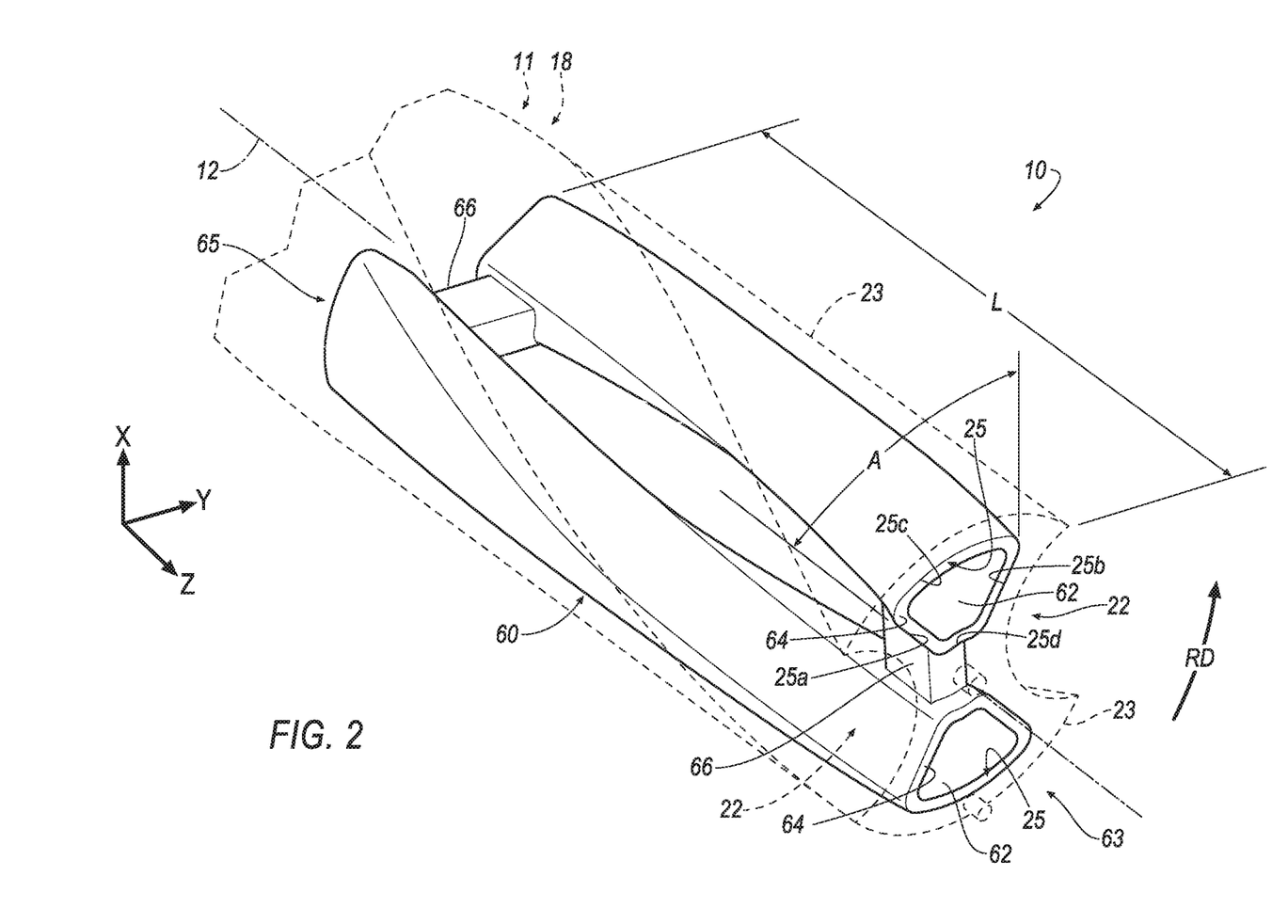
FIG. 2 is an enlarged cross-sectional view of the modular drill taken along line 2-2 of FIG. 1 showing the tunable vibration absorber assembly of the invention with tunable absorber masses having a fan-shaped cross-section disposed within the lobes of the modular drill.

FIG. 2 is a cross-sectional view of the chip flute portion 18 of the cutting tool 10 taken along a plane orthogonal to a plane lying along the central, longitudinal axis 12. Use of the rotary cutting tool 10 in a metalworking operation will produce vibrations that travel through the cutting tool 10, thereby affecting the stability of the cutting process. For this reason, the chip flute portion 18 of the rotary cutting tool 10 includes a tunable vibration absorber assembly, shown generally at 60, for suppressing torsional and axial vibrations of the rotary cutting tool 10, as shown in FIG. 2.

In general, the tunable vibration absorber assembly 60 is disposed within a cavity 25 in each lobe 23 of the chip flute portion 18 and has a length, L, along the central, longitudinal axis 12 of the cutting tool 10. The tunable vibration absorber assembly 60 comprises at least two tunable absorber masses 62, a resilient material 64 disposed between each tunable absorber mass 62 and the cavity 25, and one or more connecting members 66 for rigidly fixing each absorber mass 62 to each other. The tunable vibration absorber assembly 60 has a forward end 63 and a rearward end 65. In the illustrated embodiment, the modular drill 10 has two flutes 22 and lobes 23. Thus, the tunable vibration absorber assembly 60 has two tunable absorber masses 62; one tunable absorber mass 62 following the twisted, helical path of one lobe 23 and another tunable absorber mass 62 following the twisted, helical path of the other lobe 23.

It should be noted that the one or more connecting members 66 do not contact the tool body 11, and thereby enabling the absorber masses 62 to be supported or suspended only by the resilient member 64. As a result, the absorber assembly 60 can be tuned to the desired frequency, such as the first natural frequency of a torsional vibration mode of the cutting tool 10, by selecting one or more material properties of the tunable vibration absorber assembly 60. It should be noted that the tunable vibration absorber assembly 60 can be made using a 3D printing process (i.e., additive manufacturing).

The material for the absorber masses 62 is selected for its material properties, such as stiffness, density and the like. In one embodiment, the absorber masses 62 are made of the same material as the tool body 11. For example, the absorber masses 62 can be made of tool steel, carbide, and the like. In another embodiment, the absorber masses 62 can be made of a different material than the tool body 11. Typically, the absorber masses 62 is made of a material that has a density equal to or greater than the tool body 11. For example, the absorber masses 62 can be made of lead, heavy metal, bronze, and the like, and the tool body 11 can be made of tool steel, carbide, and the like.

Similar to the absorber masses 62, the resilient member 64 is selected for its material properties, such as stiffness, viscous damping, density, and the like. In one embodiment, the resilient member 64 is made of a polymer with viscoelasticity (i.e., both viscosity and elasticity) with a generally low Young's modulus and high failure strain, as compared to other materials. In one embodiment, the resilient member 64 can be made of a commercially available fluoropolymer elastomer sold under the tradename VITON®, which is a registered trademark of The Chemours Company having headquarters in Wilmington, Del.

Similar to the tunable absorber masses 62 and the resilient member 64, the one or more connecting members 66 is selected for its material properties, such as stiffness, density, and the like. For example, the material for the one or more connecting members 66 has a sufficient stiffness to prevent relative angular displacement between the at least two tunable absorber masses 62 about the central, longitudinal axis 12 of the cutting tool 10. In the illustrated embodiment, the tunable vibration absorber assembly 60 includes two connecting members 66; one connecting member 66 proximate the forward end 63 and the other connecting member 66 proximate the rearward end 65 of the tunable vibration absorber assembly 60. The connecting members 66 can have any desirable cross-sectional shape, such as circular, polygonal, and the like, so long as the connecting member 66 prevents relative angular displacement between the absorber masses 62 about the central, longitudinal axis 12 of the cutting tool 10. The invention can be practiced without the connecting members 66. However, it has been found that by preventing the relative angular movement between the absorber masses 62 in relation to the central, longitudinal axis 12 of the cutting tool 10, the tunability of the vibration absorber assembly 60 is improved because the connecting members 66 reduce the number of degrees of freedom of the tunable absorber masses 62. Also, it has been found that connecting the masses enables each absorber mass 62 to oscillate at the same frequency and act as one large mass, instead of multiple independent masses, thereby increasing the damping effect on the drill.

As shown in FIG. 2, the cavity 25 is non-circular in cross-sectional shape. Specifically, the cavity 25 has a geometry that maximizes the cross-sectional area of the absorber masses 62 without significantly affecting the overall stiffness of the cutting tool 10. In the illustrated embodiment, the cavity 25 has a fan-shaped cross-section defined by a front planar wall 25*a* extending in a radial direction of the cutting tool 10 on a front side of a rotation direction, RD of the cutting tool 10. The cavity 25 also includes a rear planar wall 25*b* extending in the radial direction on a rear side of the rotation direction, RD, of the cutting tool 10 and opposed to the front planar wall 25*a* in a circumferential direction of the cutting tool 10. An angle, A, is formed by the front planar wall 25*a* and the rear planar wall 25*b*. The angle, A, can be in a range between about 15° to about 40°. The cavity 25 also has a radially outward arcuate wall 25*c* made up of a partially cylindrical surface whose center lies on a center, longitudinal axis 12 of the cutting tool 10, and a radially inward arcuate wall 25*d* made up of a partially cylindrical surface whose center lies on the central, longitudinal axis 12 of the cutting tool.

Figure 3:
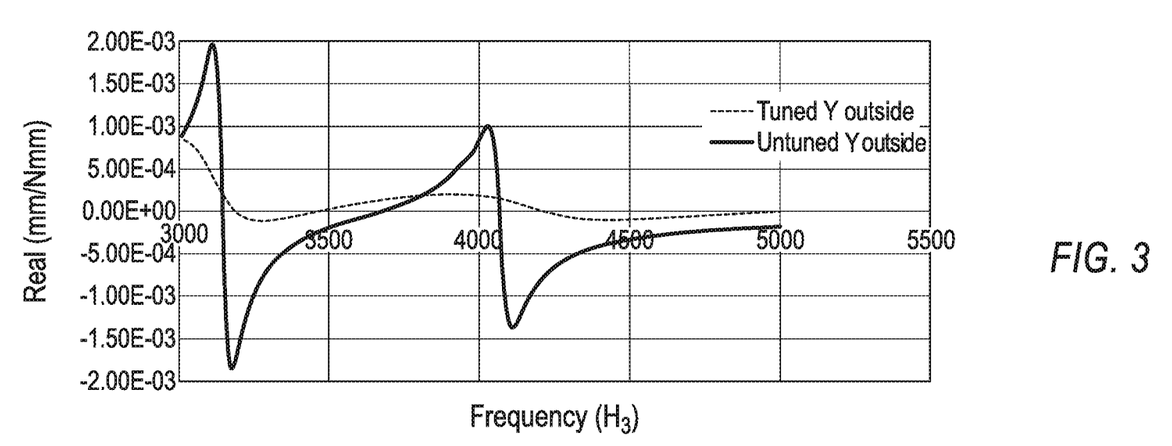
FIG. 3 is a graphical representation of a simulated frequency response function illustrating the tangential displacement (Y-direction) of a tuned modular drill of the invention and a modular drill without the tunable vibration absorber assembly of the invention measured at a periphery of the modular drill.

FIG. 3 is a graphical representation of a simulated frequency response function illustrating displacement in the tangential direction (i.e., Y-direction) of a modular drill with the tunable vibration absorber assembly 60 of the invention and the same modular drill, but without the tunable vibration absorber assembly of the invention as measured at a periphery of the modular drill. As shown in FIG. 3, the displacement in the tangential direction (i.e., Y-direction) at the periphery at the torsional frequency of about 4100 Hz was reduced by a factor of about thirteen (13) in the modular drill with the tunable vibration absorber assembly 60 of the invention.

Figure 4:
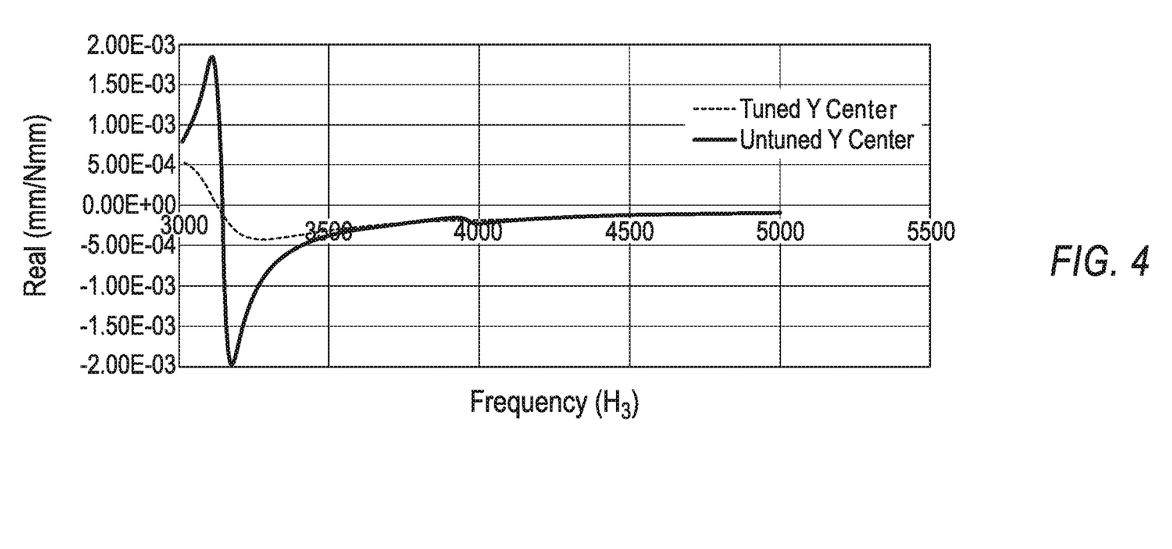
FIG. 4 is a graphical representation of a simulated frequency response function illustrating the radial displacement (Y-direction) of a tuned modular drill of the invention and a modular drill without the tunable vibration absorber assembly of the invention measured at a center of the modular drill.

FIG. 4 is a graphical representation of a simulated frequency response function illustrating displacement in the radial direction (i.e., Y-direction) of a modular drill with the tunable vibration absorber assembly 60 of the invention and the same modular drill, but without the tunable vibration absorber assembly of the invention as measured at a center (i.e., at the central, longitudinal axis 12) of the modular drill.

As shown in FIG. 4, the radial displacement at a bending frequency of about 3200 Hz decreased by a factor greater than 4.5 at the central, longitudinal axis 12 of a modular drill with the tunable vibration absorber assembly 60 of the invention.

Figure 5:
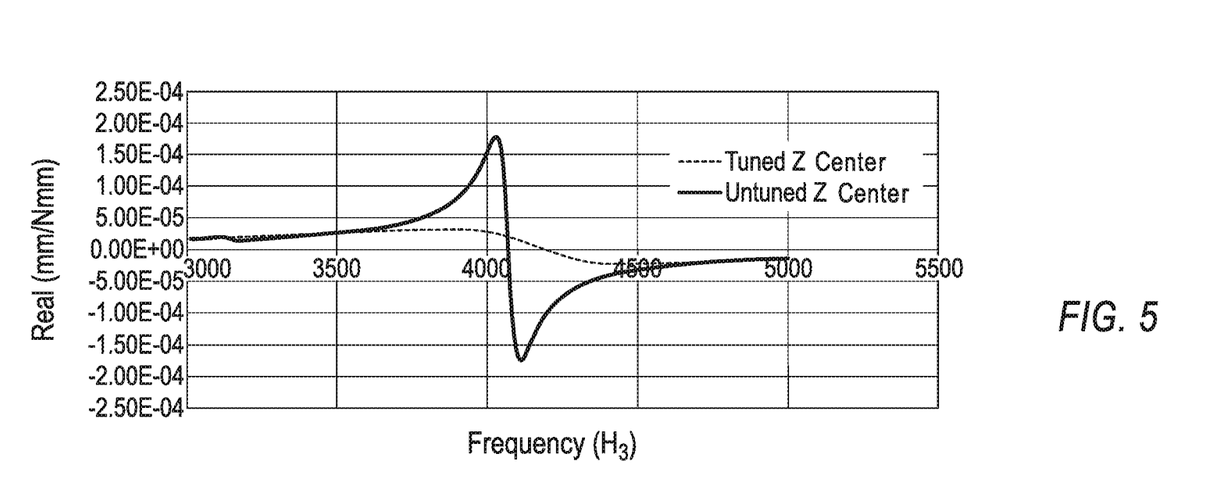
FIG. 5 is a graphical representation of a simulated frequency response function illustrating the axial displacement (Z-direction) of a tuned modular drill of the invention and a modular drill without the tunable vibration absorber assembly of the invention measured at the center of the tip of the modular drill.

FIG. 5 is a graphical representation of a simulated frequency response function illustrating displacement in the axial direction (i.e., Z-direction) of a modular drill with the tunable vibration absorber assembly 60 of the invention and the same modular drill, but without the tunable vibration absorber assembly of the invention as measured at the center of the cutting tip of the modular drill. As shown in FIG. 5, the axial displacement (i.e., displacement in the Z-direction) at the torsional frequency of about 4100 Hz was reduced by a factor of about eight (8) in the modular drill with the tunable vibration absorber assembly 60 of the invention. It is known that the axial and angular displacement in drills is coupled due to the helical shape of the flutes. The reduction in amplitude of the angular displacement due to damping the torsional mode by way of the tunable vibration absorber assembly (FIG. 3) also causes a reduction in amplitude of the axial displacement.

Figure 6:
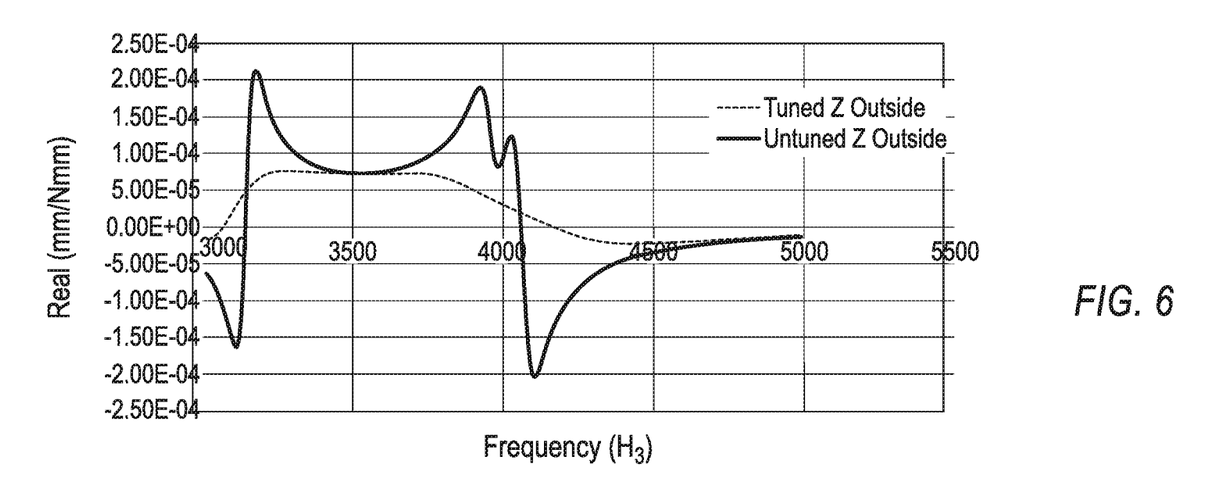
FIG. 6 is a graphical representation of a simulated frequency response function illustrating the axial displacement (Z-direction) of a tuned modular drill of the invention and a modular drill without the tunable vibration absorber assembly of the invention measured at a periphery of the modular drill.

FIG. 6 is a graphical representation of a simulated frequency response function illustrating displacement in the axial direction (i.e., Z-direction) of a modular drill with the tunable vibration absorber assembly 60 of the invention and the same modular drill, but without the tunable vibration absorber assembly of the invention as measured at a periphery of the modular drill. As shown in FIG. 6, the displacement in the axial direction (i.e., Z-direction) at the torsional frequency of about 4100 Hz was reduced by a factor of about eight (8) in the modular drill with the tunable vibration absorber assembly 60 of the invention.

In summary, the rotary cutting tool 10, such as a modular drill, that includes the tunable vibration absorber assembly 60 of the invention, produced the unexpected results of significantly reducing tangential, axial and radial displacement of the modular drill, as compared to the same modular drill, but without the tunable vibration absorber assembly 60 of the invention.

As mentioned above, the absorber masses 62 and the resilient member 64 have a non-circular cross-sectional shape that conform to the shape of the cavity 25. However, it will be appreciated that the invention is not limited to the cross-sectional shape of the absorber masses 62 and the resilient member 64, and that the invention can be practiced with absorber masses and resilient members having any desirable cross-sectional shape.

Figure 7:
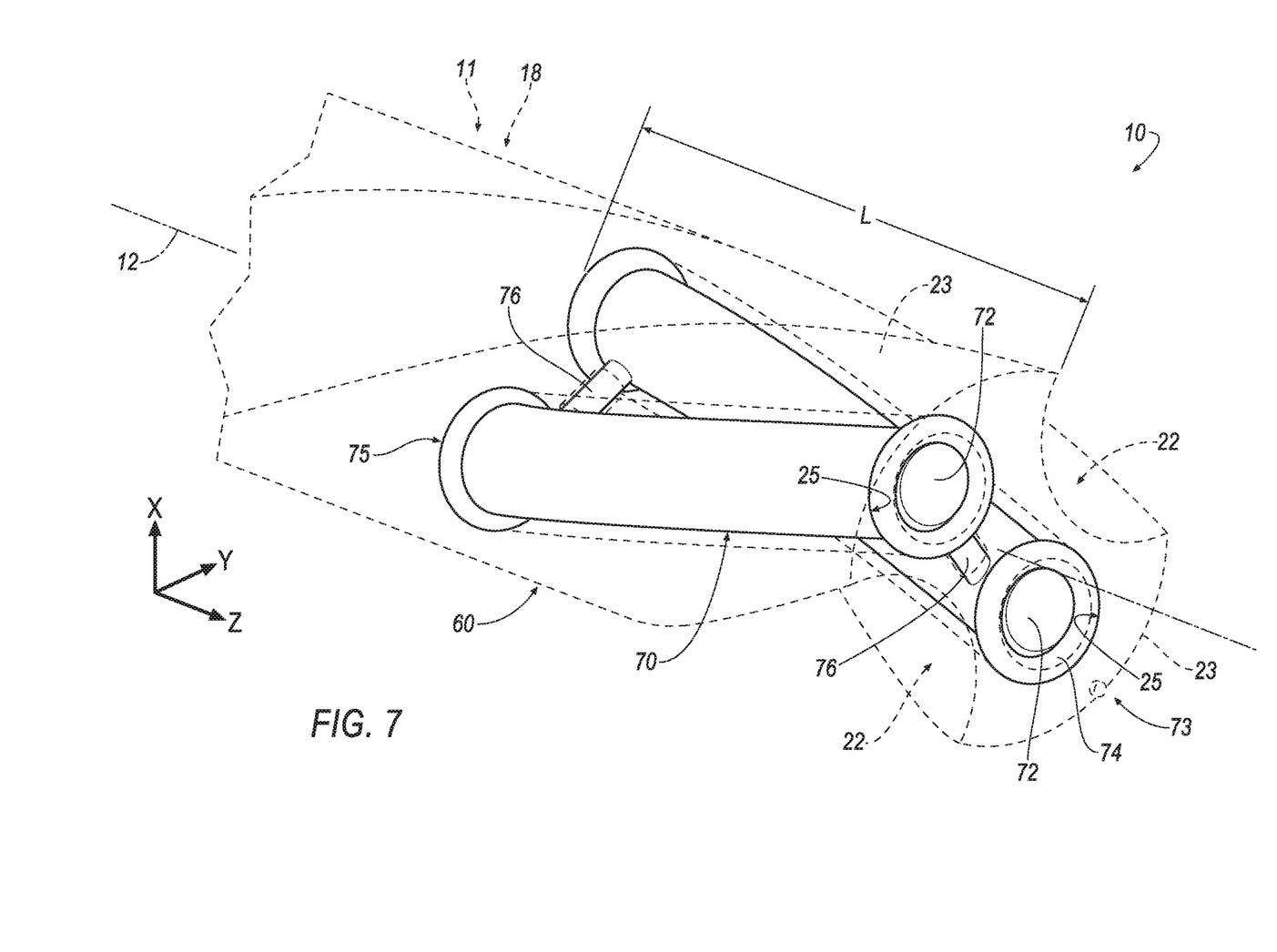
FIG. 7 is an enlarged cross-sectional view of the modular drill taken along line 2-2 of FIG. 1 showing the vibration absorber assembly of the invention with tunable absorber masses having a circular-shaped cross-section disposed within the lobes of the modular drill.
Figure 8:
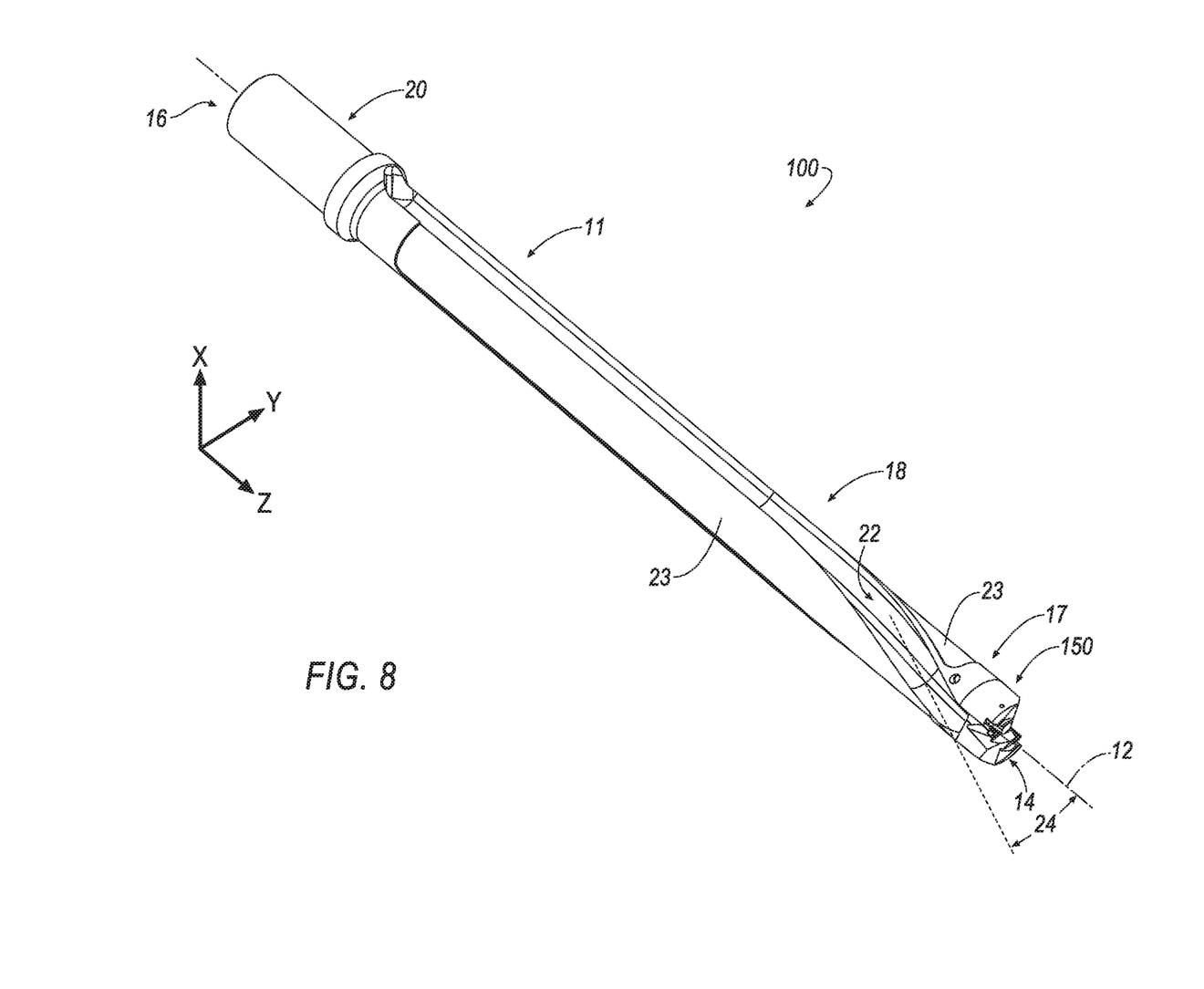
FIG. 8 is a perspective view of a rotary cutting tool, such as a modular drill, with an internal tunable vibration absorber assembly disposed within a replaceable cutting head according to an embodiment of the invention.
Figure 9:
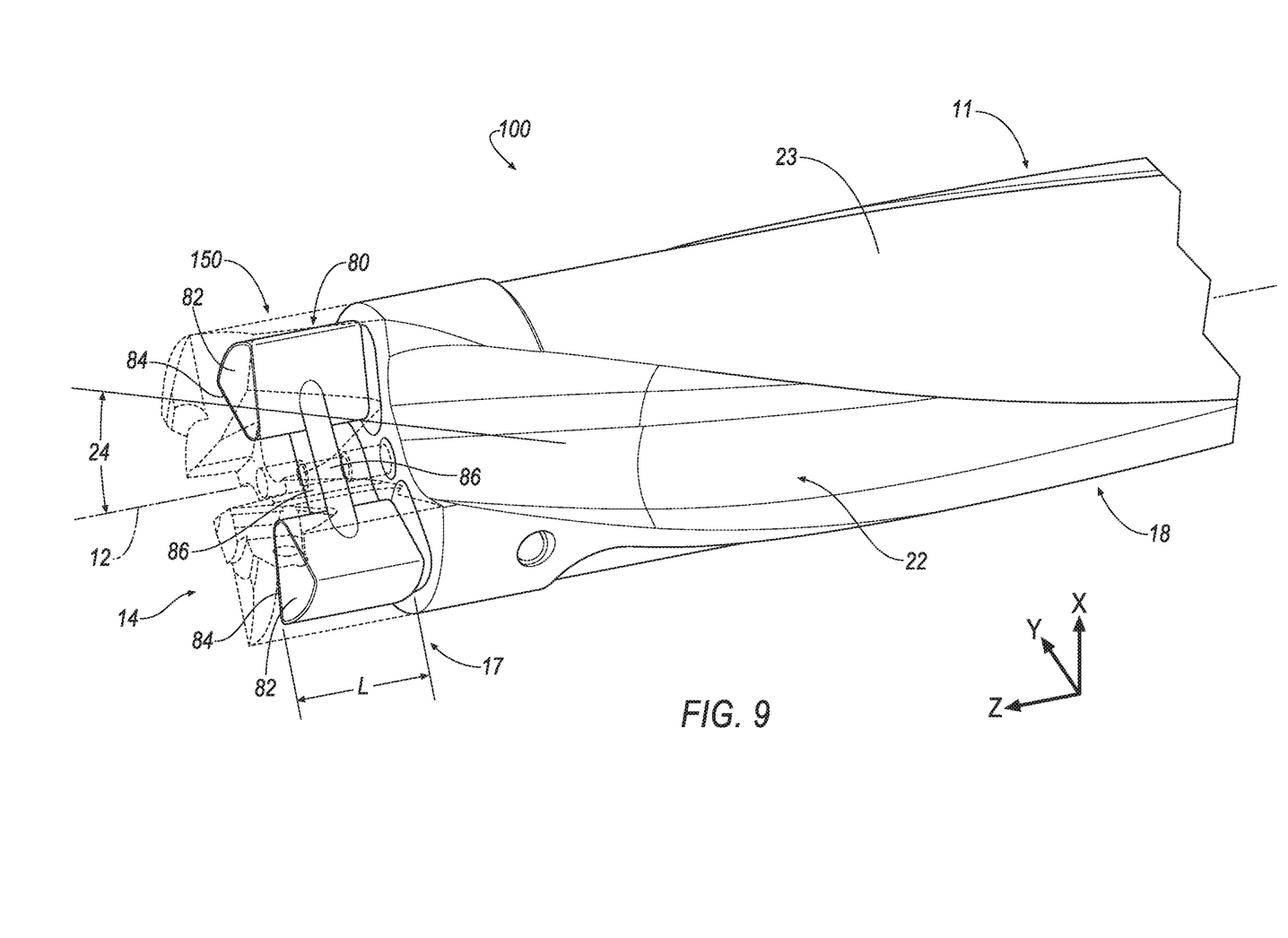
FIG. 9 is an enlarged view of the replaceable cutting head of the modular drill of FIG. 8 with a tunable vibration absorber assembly disposed within the replaceable cutting head according to an embodiment of the invention.
Figure 10:
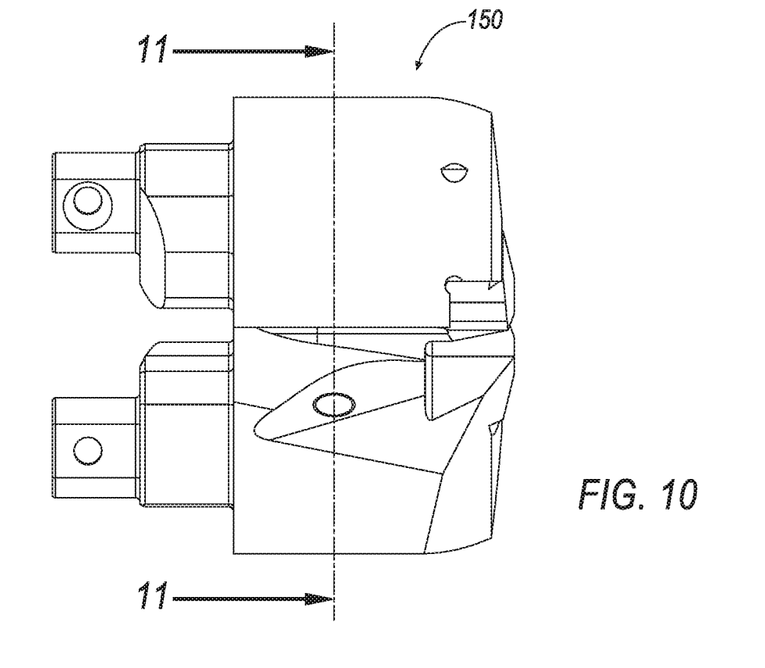
FIG. 10 is a side view of the replaceable cutting head of FIG. 8 with the tunable vibration absorber assembly disposed within the replaceable cutting head according to an embodiment of the invention.
Figure 11:
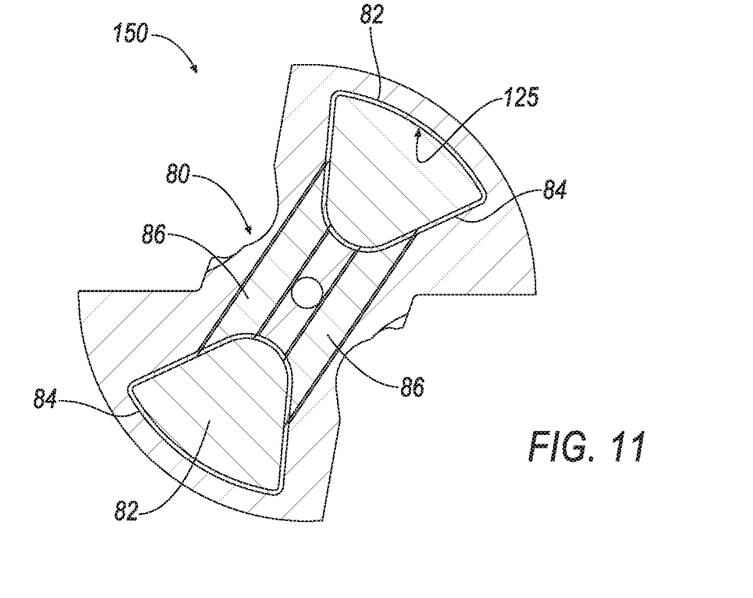
FIG. 11 is a cross-sectional view of the replaceable cutting head with the tunable vibration absorber assembly disposed within the replaceable cutting head taken along line 11-11 of FIG. 10.
Figure 12:
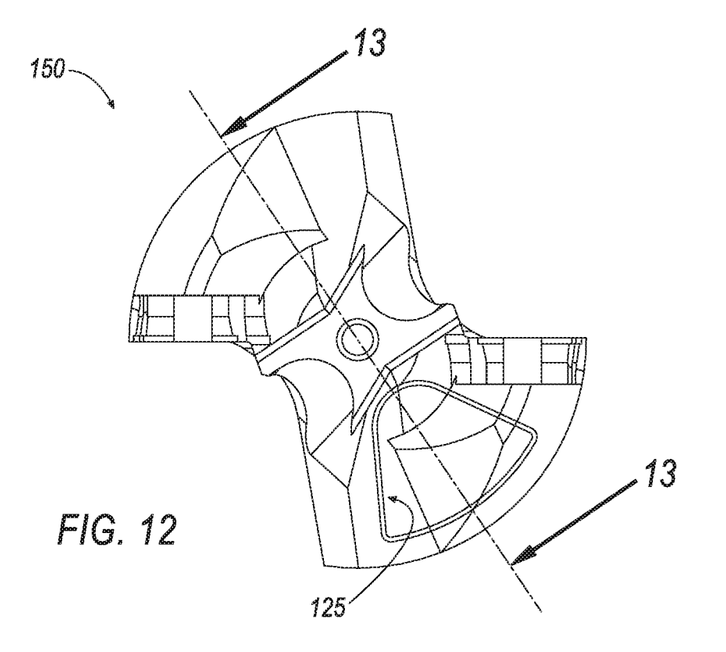
FIG. 12 is a top view of the replaceable cutting head of FIG. 8 with the tunable vibration absorber assembly disposed within the replaceable cutting head.
Figure 13:
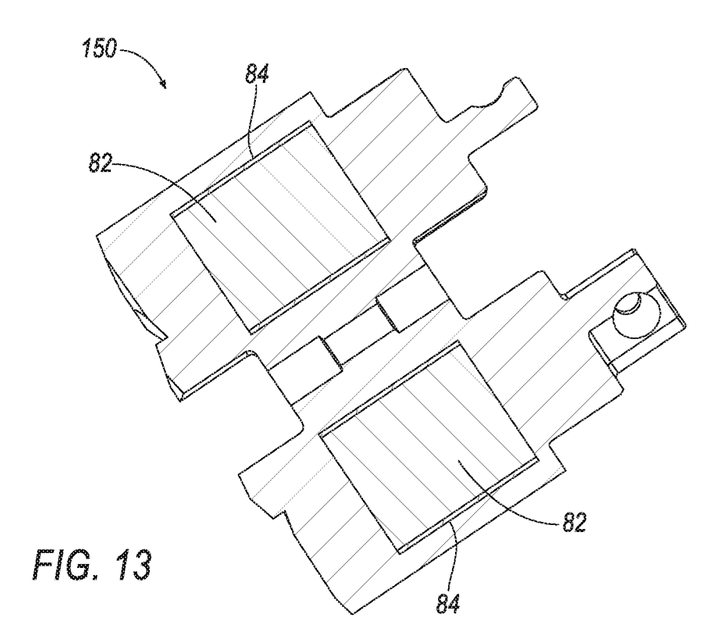
FIG. 13 is a cross-sectional view of the replaceable cutting head of FIG. 8 with the tunable vibration absorber assembly disposed within the replaceable cutting head taken along line 13-13 of FIG. 12.

Referring now to FIG. 7, a tunable vibration absorber assembly 70 is shown according to another aspect of the invention. In this aspect the tunable vibration absorber assembly 70 has a substantially circular cross-sectional shape, rather than a fan-shaped cross-section of the tunable vibration absorber assembly 60. Thus, the cavity 25 has a substantially circular cross-sectional shape. In addition, the connecting members 76 also have a substantially circular cross-sectional shape, unlike the connecting members 66 having a substantially non-circular cross-sectional shape. In the illustrated embodiment, the tunable vibration absorber assembly 70 has two connecting members 76; one connecting member 76 proximate a forward end 73 and the other connecting member 76 proximate a rearward end 75 of the tunable vibration absorber assembly 70. Similar to the connecting members 66, the connecting members 76 do not contact the tool body 11, thereby enabling the absorber masses 72 to be suspending or supported by the elastomer member 74.

As described above, the tunable vibration absorber assembly 60, 70 is disposed within chip flute portion 18 of the modular drill 10. Specifically, the tunable absorber masses 62, 72 are disposed within each lobe 23 of the modular drill 10. However, it should be appreciated that the invention is not limited by the location of the tunable vibration absorber assembly 60, 70 being located in the chip flute portion 18 of the modular drill 10, and that the invention can be practiced with the tunable vibration absorber assembly 60, 70 being disposed at any desirable location.

Referring now to FIGS. 8-13, a modular cutting tool 100 is shown according to another embodiment of the invention. In the illustrated embodiment, the modular cutting tool 100 has a replaceable cutting head 150 with a tunable vibration absorber assembly 80 disposed therein. The tunable vibration absorber assembly 80 is generally similar in design as the tunable vibration absorber 60 with absorber masses having a fan-shaped cross-section, as shown in FIG. 2. However, it should be realized that the tunable vibration absorber assembly 80 can be similar in design to the tunable vibration absorber assembly 70 with the tunable absorber masses 82 having a substantially circular cross-section, as shown in FIG. 7.

In general, the tunable vibration absorber assembly 80 is disposed within a cavity 125 in the replaceable cutting head 150 and has a length, L, along the central, longitudinal axis 12 of the modular drill 100. Similar to the tunable vibration absorber assemblies 60, 70, the tunable vibration absorber assembly 80 comprises at least two tunable absorber masses 82, a resilient material 84 disposed between each tunable absorber mass 82 and the cavity 125, and one or more connecting members 86 for rigidly fixing each absorber mass 82 to each other. In the illustrated embodiment, the modular drill 100 has two flutes 22 and lobes 23. Thus, the tunable vibration absorber assembly 80 has two tunable absorber masses 82; one tunable absorber mass 82 following the twisted, helical path of one lobe 23 and another tunable absorber mass 82 following the twisted, helical path of the other lobe 23.

It should be noted that the one or more connecting members 86 do not contact the cutting head body 11, and thereby enabling the absorber masses 82 to be supported or suspended only by the resilient member 84. As a result, the absorber assembly 80 can be tuned to the desired frequency, such as the first natural frequency of the torsional vibration mode of the cutting tool 100, by selecting one or more material properties of the tunable vibration absorber assembly 80. It should be noted that the tunable vibration absorber assembly 80 can be made using a 3D printing process (i.e., additive manufacturing). It is believed that locating the absorber masses 82 closer to the cutting edges of the replaceable cutting head 150 improves the effectiveness of the tunable vibration absorber assembly 80.

Although the rotary cutting tool 10 comprises a modular drill, it should be appreciated that the principles of the invention can be practiced with a solid drill, such as a solid carbide drill, in which the tunable absorber masses are in the lobes of the solid carbide drill, similar to the tunable vibration absorber assembly 60 shown in FIG. 2.

The patents and publications referred to herein are hereby incorporated by reference.

Having described presently preferred embodiments the invention may be otherwise embodied within the scope of the appended claims.

What is claimed is:

1. A rotary cutting tool, comprising:
a tool body including a chip flute portion having a plurality of helical chip flutes separated by lobes; and
a tunable vibration absorber assembly disposed within a cavity formed in the chip flute portion, the tunable vibration absorber assembly comprising at least two tunable absorber masses, a resilient material between the at least two absorber masses and the cavity, and one or more connecting members for preventing relative angular displacement between the at least two tunable absorber masses about a central, longitudinal axis of the cutting tool,
wherein the one or more connecting members do not contact the tool body to enable the at least two tunable absorber masses to be suspended only by the resilient material, thereby enabling the tunable vibration absorber assembly to be tuned to a desired frequency for suppressing torsional vibration of the rotary cutting tool during a cutting operation.

2. The rotary cutting tool of claim 1, wherein the at least two tunable absorber masses have a fan-shaped cross-section.

3. The rotary cutting tool of claim 1, wherein the at least two tunable absorber masses have a circular-shaped cross-section.

4. The rotary cutting tool of claim 1, wherein the at least two tunable absorber masses are disposed within each lobe of the chip flute portion.

5. The rotary cutting tool of claim 1, wherein the at least two tunable absorber masses are made of a material having a density equal to or greater than the tool body.

6. The rotary cutting tool of claim 1, wherein the desired frequency corresponds to a first natural frequency of a torsional vibration mode of the rotary cutting tool.

7. The rotary cutting tool of claim 1, wherein the tunable vibration absorber assembly is formed by additive manufacturing.

* * * * *